United States Patent Office 2,719,152
Patented Sept. 27, 1955

2,719,152

MEROCYANINE DYES CONTAINING A 2-THIO-HYDANTOIN NUCLEUS AND PREPARATION THEREOF

Roy A. Jeffreys, Harrow, England, assignor to Eastman Kodak Company, Rochester, N. Y., a corporation of New Jersey No Drawing. Application August 3, 1953, Serial No. 372,181

7 Claims. (Cl. 260—240.4)

This invention relates to merocyanine dyes containing a 2-thiohydantoin nucleus and to methods for preparing them. More particularly, this invention relates to merocyanine dyes containing a 2-thiohydantoin nucleus containing and acyl substitutent, and to methods for preparing them.

Merocyanine dyes containing a 2-thiohydantoin nucleus have long been known. Some of these dyes have been found to be quite useful in increasing the sensitivity of photographic silver halide emulsions.

I have now found an entirely new class of merocyanine dyes which are useful as sensitizers for photographic silver halide emulsions.

It is, accordingly, an object of my invention to provide a new class of merocyanine dyes. A further object is to provide methods for preparing these new dyes. Still another object is to provide photographic silver halide emulsions sensitized with these new dyes, and methods for preparing these emulsions. Other objects will become apparent from a consideration of the following description and examples.

According to my invention, I provide new merocyanine dyes represented by the following general formula:

I 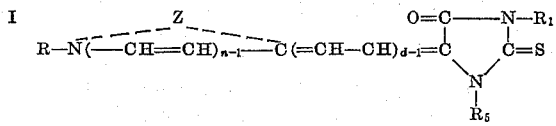

wherein R represents an alkyl group, such as methyl, ethyl, n-propyl, isopropyl, n-butyl, isobutyl, n-amyl, n-octyl, beta-hydroxyethyl, beta-chloroethyl, beta-acetoxyethyl, etc. groups, (especially alkyl groups of the formula $C_mH_{2m+1}$ wherein $m$ represents a positive integer of from 1 to 8), $R_1$ represents an alkyl group, such as the alkyl groups defined by R above, as well as cycloalkyl groups, e. g. cyclopropyl, cyclobutyl, cyclopentyl, cyclohexyl (especially cycloalkyl groups containing from 3 to 6 carbon atoms in the cycloalkyl ring), or aralkyl groups, e. g. benzyl, beta-phenylethyl, etc., $n$ represents a positive integer of from 1 to 2, $d$ represents a positive integer of from 1 to 3, $R_5$ represents an acyl group, such as acetyl, propionyl, butyryl, isobutyryl, benzoyl, etc., and Z represents the non-metallic atoms necessary to complete a heterocyclic nucleus containing from 5 to 6 atoms in the heterocyclic ring, such as those selected from the group consisting of those of the thiazole series (e. g. thiazole, 4-methylthiazole, 4-phenylthiazole, 5-methylthiazole, 5-phenylthiazole, 4,5-dimethylthiazole, 4,5-diphenylthiazole, 4-(2-thienyl) thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6 - dioxymethylenebenzothiazole, 5-hydroxybenzothiazole, 6-hydroxybenzothiazole, etc.), those of the naphthothiazole series (e. g. alpha-naphthothiazole, beta-naphthothiazole, 5-methoxy-beta-naphthothiazole, 5-ethoxy-beta-naphthothiazole, 8-methoxy-alpha-naphthothiazole, 7-methoxy - alpha-naphthothiazole, etc.), those of the thionaphtheno-7',6',4,5-thiazole series (e. g. 4'-methoxythionaphtheno-7',6',4,5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e. g. alpha-naphthoxazole, beta-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5-methoxybenzoselenazole, 5-hydroxybenzoselenazole, tetrahydrobenzoselenenazole, etc.), those of the naphthoselenazole series (e. g. alpha-naphthoselenazole, beta-naphthoselenazole, etc.), those of the thiazoline series (e. g. thiazoline, 4-methylthiazolone, etc.), those of the 2-quinoline series (e. g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline, 3,4-dihydroisoquinoline, etc.), those of the 3-isoquinoline series (e. g. isoquinoline, etc.), those of the 3,3-dialkylindolenine series (e. g. 3,3-dimethylindolenine, 3,3,5-trimethylindolenine, 3,3,7-trimethylindolenine, etc.), those of the pyridine series (e. g. pyridine, 5-methylpyridine, etc.), etc.

According to the process of my invention, I prepare the merocyanine dyes of Formula I above, where $d$ is 2 or 3 by condensing a cyclammonium quaternary salt selected from those represented by the following general formula:

II 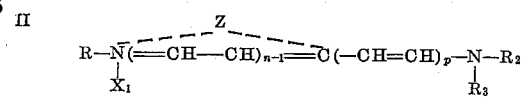

wherein R, Z, and $n$ have the values set forth above, $R_2$ represents a hydrogen atom, an alkyl group (e. g. methyl, ethyl, etc.), or the acyl group of a carboxylic acid (e. g. acetyl, propionyl, etc.), $R_3$ represents an aryl group (e. g. phenyl, o-, m-, and p-tolyl, etc.), or $R_2$ and $R_3$ together represent the non-metallic atoms necessary to complete a heterocyclic nucleus (e. g. a piperidyl, morpholinyl, etc. nucleus), $p$ represents a positive integer from 1 to 2, and $X_1$ represents an acid radical, e. g. Cl⁻, Br⁻, I⁻, $C_2H_5SO_4^-$, p-$CH_3C_6H_4SO_3^-$, SCN⁻, etc., with a 2-thiohydantoin compound selected from those represented by the following general formula:

III 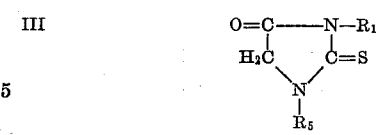

wherein $R_1$ and $R_5$ each have the values set forth above.

The condensations are advantageously carried out in the presence of a basic condensing agent, e. g. the trialkylamines, such as triethylamine, tri-n-butylamine, etc., dialkylanilines, such as N,N-diethylaniline, etc., heterocyclic tertiary amines, such as pyridine, quinoline, N-alkyl piperidines, etc., alkali metal alcoholates, such as sodium ethylate. The condensations can also be carried out in the presence of an inert diluent, such as methanol, ethanol, n-propanol, isopropanol, n-butanol, diethyl ether, acetone, 1,4-dioxane, etc.

The merocyanine dyes of Formula I above where $d$ is 1 can be prepared by condensing a cyclammonium quaternary salt selected from those represented by the following general formula:

IV

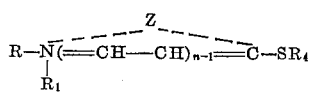

wherein R, Z, $X_1$, and $n$ have the values set forth above, and $R_4$ represents an alkyl group, such as methyl, ethyl, etc., or an aryl group, such as phenyl, o-, m-, and p-tolyl, etc., with a 2-thiohydantoin selected from those represented by Formula III above. The condensations can advantageously be carried out in the presence of a basic condensing agent, such as the trialkylamines (e. g. triethylamine, tri-n-butylamine, etc.), dialkylanilines (e. g. N,N-dimethyl-, and N,N-diethylaniline, etc.), heterocyclic tertiary amines (e. g. pyridine, quinoline, N-alkylpiperidines, etc.), alkali metal alcoholates (e. g. sodium methylate, sodium ethylate, etc.), etc. The condensations can also be carried out in the presence of an inert diluent, such as methanol, ethanol, n-propanol, isopropanol, n-butanol, isobutanol, diethyl ether, acetone, 1,4-dioxane, etc.

The following examples will serve to illustrate more fully the manner whereby I practice my invention.

*Example 1.—1-acetyl-5-[(3-ethylbenzoxazolin-2-ylidene)- ethylidene]-3-methyl-2-thiohydantoin*

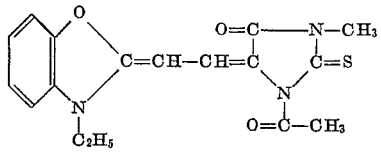

4.0 g. of 1-acetyl-3-methyl-2-thiohydantoin, 4.3 g. of 2-beta-acetanilidovinylbenzoxazole ethiodide and 1.01 g. of triethylamine in 15 cc. of ethanol were refluxed for 10 minutes on the steam bath. After chilling and filtering, the dye was recrystallized from pyridine-methanol as chocolate-brown leaflets, M. P. 204° C.

*Example 2.—1-acetyl-5-[(3-ethylbenzoxazolin-2-ylidene)- ethylidene]-3-ethyl-2-thiohydantoin*

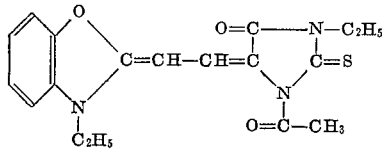

4.0 g. of 1-acetyl-3-ethyl-2-thiohydantoin, 4.34 g. of 2-beta-acetanilidovinylbenzoxazole ethiodide with 1.01 g. of triethylamine in 15 cc. of ethanol were refluxed together for 10 minutes on the steam bath. After chilling and filtering, the dye was recrystallized from pyridine ether as a black-red powder, M. P. 264° C. dec.

*Example 3.—1-acetyl-5-[(3-ethylbenzoxazolin-2-ylidene)- ethylidene]-3-n-octyl-2-thiohydantoin*

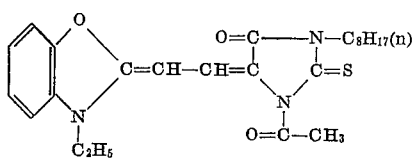

2.0 g. of 1-acetyl-3-n-octyl-2-thiohydantoin, 2.17 g. of 2-beta-acetanilidovinylbenzoxazole ethiodide with 0.5 g. of triethylamine in 10 cc. of ethanol were refluxed together for 10 minutes on the steam bath. After chilling and filtering, the dye was recrystallized from ethanol as an orange sponge, M. P. 176° C.

*Example 4.—1 - acetyl-3-benzyl-5-[(3-ethylbenzoxazolin-2-ylidene)ethylidene]-2-thiohydantoin*

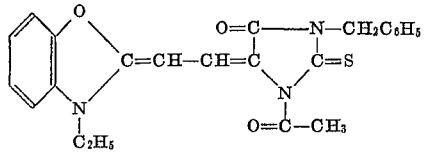

2.0 g. of 1-acetyl-3-benzyl-2-thiohydantoin, 2.17 g. of 2-β-acetanilidovinylbenzoxazole ethiodide with 0.5 g. of triethylamine in 10 cc. of ethanol were refluxed together for 10 minutes on the steam bath. After chilling and filtering, the dye was recrystallized from benzene-petroleum ether as orange needles, M. P. 220° C.

*Example 5.—1-acetyl-3-carboxymethyl-5-[(3-ethylbenzoxazolin-2-ylidene)ethylidene]-2-thiohydantoin*

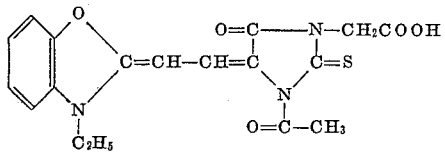

2.0 g. of 1-acetyl-3-carboxymethyl-2-thiohydantoin, 2.17 g. of 2-β-acetanilidovinylbenzoxazole ethiodide, 0.5 g. of triethylamine, and 10 cc. of ethanol were heated together for 10 minutes on the steam bath. The dye, after chilling and filtering, was recrystallized from ethanol-ether as an orange-brown powder, M. P. 243° C.

*Example 6.—1-acetyl-3-ethyl-5-[(3-ethylbenzothiazolin-2-ylidene)ethylidene]-2-thiohydantoin*

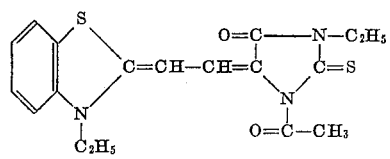

4.0 g. of 1-acetyl-3-ethyl-2-thiohydantoin, 4.5 g. of 2-β-acetanilidovinylbenzothiazole ethiodide with 1.0 g. of triethylamine in 15 cc. of ethanol were refluxed on the steam bath for 10 minutes. After chilling and filtering, the dye was recrystallized from benzene-petroleum ether as dark blue prisms, M. P. 201° C.

*Example 7.—1-acetyl-5-[(3-ethylbenzothiazolin-2-ylidene)ethylidene]-3-n-octyl-2-thiohydantoin*

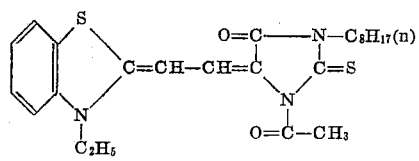

2.0 g. of 1-acetyl-3-n-octyl-2-thiohydantoin, 2.25 g. of 2-β-acetanilidovinylbenzothiazole ethiodide with 0.5 g. of triethylamine in 10 cc. of ethanol were refluxed on the steam bath for 10 minutes. After chilling and filtering, the dye was recrystallized from benzene-petroleum ether as orange flakes, M. P. 180° C.

*Example 8.—1-acetyl-3-benzyl-5-[(3-ethylbenzothiazolin-2-ylidene)ethylidene]-2-thiohydantoin*

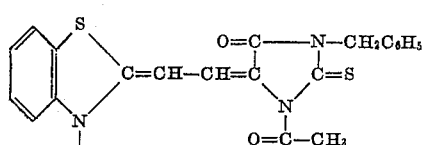

2.0 g. of 1-acetyl-2-benzyl-2-thiohydantoin, 2.25 g. of 2-β-acetanilidovinylbenzothiazole ethiodide with 0.5 g. of triethylamine in 10 cc. of ethanol were refluxed on the steam bath for 10 minutes. After chilling and filtering, the dye was recrystallized from benzene-petroleum ether as maroon needles with bronze reflex, M. P. 210° C.

*Example 9.—1-acetyl-5-[(3-ethylbenzothiazolin-2-ylidene)ethylidene]-3-cyclohexyl-2-thiohydantoin*

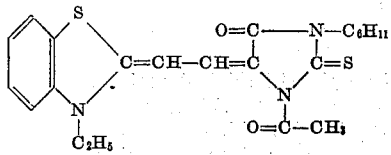

2.0 g. of 1-acetyl-3-cyclohexyl-2-thiohydantoin, 2.25 g. of 2-β-acetanilidovinylbenzothiazole ethiodide with 0.5 g. of triethylamine in 10 cc. of ethanol were refluxed on the steam bath for 10 minutes. After chilling and filtering, the dye was recrystallized from benzene-petroleum ether as glossy crimson needles, M. P. 221° C.

*Example 10.—1-acetyl-3-carboxymethyl-5-[(3-ethylbenzothiazolin-2-ylidene)ethylidene]-2-thiohydantoin*

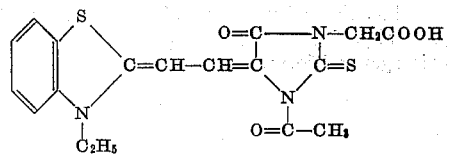

2.0 g. of 1-acetyl-3-carboxymethyl-2-thiohydantoin, 2.25 g. of 2-β-acetanilidovinylbenzothiazole ethiodide with 0.5 g. of triethylamine in 10 cc. of ethanol were refluxed on the steam bath for 10 minutes. After chilling and filtering, the dye was recrystallized from benzene-petroleum ether as green prisms, M. P. 248° C.

*Example 11.—1-acetyl-3-ethyl-5-[(3-ethylthiazolidin-2-ylidene)ethylidene]-2-thiohydantoin*

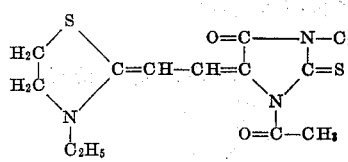

2.0 g. of 1-acetyl-3-ethyl-2-thiohydantoin, 2.01 g. of 2-β-acetanilidovinylthiazoline ethiodide with 0.5 g. of triethylamine in 10 cc. of ethanol were refluxed for 10 minutes. After chilling and filtering, the dye was recrystallized from methanol with an ethylacetate-petroleum ether mixture as glistening orange needles, M. P. 179° C.

*Example 12.—1 - acetyl-3-ethyl-5[4-(3-ethylbenzothiazolin-2-ylidene)but-2en-1-ylidene]-2-thiohydantoin*

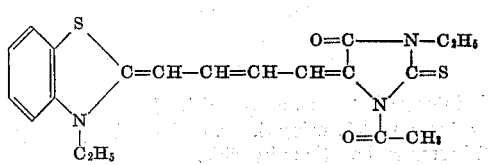

2.0 g. of 1-acetyl-3-ethyl-2-thiohydantoin, 2.38 g. of 2-(δ-acetanilido - 1,3 - butadienyl)benzothiazole ethiodide with 0.5 g. of triethylamine in 10 cc. of ethanol were refluxed for 10 minutes. After chilling and filtering, the dye was recrystallized from methanol with an ethylacetate-petroleum ether mixture as indigo needles, M. P. 155° C.

*Example 13.—1-acetyl-3-ethyl-5-[(3-ethylbenzoselenazolin-2-ylidene)ethylidene]-2-thiohydantoin*

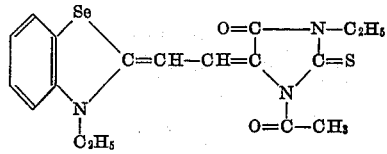

2.0 g. of 1-acetyl-3-ethyl-2-thiohydantoin, 2.5 g. of 2-β-acetanilidovinylbenzoselenazole ethiodide with 0.5 g. of triethylamine in 10 cc. of ethanol were refluxed for 10 minutes. After chilling and filtering, the dye was recrystallized from benzene-petroleum ether as an indigo powder, M. P. 243° C.

*Example 14.—1 - acetyl-3-ethyl-5-[(3-ethylnaphtho-1′:2′-4:5-thiazolin-2-ylidene)ethylidene]-2-thiohydantoin*

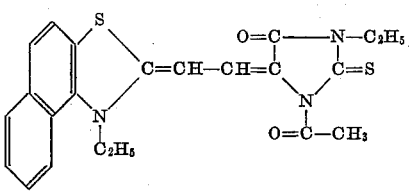

2.0 g. of 1-acetyl-3-ethyl-2-thiohydantoin, 2.5 g. of 2-β-acetanilidovinylnaphtho-1′:2′-4:5-thiazole ethiodide with 0.5 g. of triethylamine in 10 cc. of ethanol were refluxed for 10 minutes. After chilling and filtering, the dye was recrystallized from benzene-petroleum ether as maroon needles, M. P. 210° C.

*Example 15.—1 - acetyl-3-ethyl-5-[(3-ethyl-4,5-diphenyloxazolin-2-ylidene)ethylidene]-2-thiohydantoin*

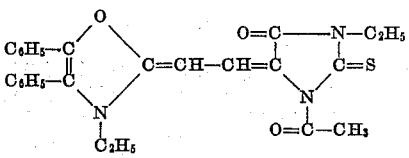

2.0 g. of 1-acetyl-3-ethyl-2-thiohydantoin, 2.69 g. of 2-β-anilinovinyl-4,5-diphenyloxazole etho-p-toluenesulfonate, 0.5 g. of acetic anhydride with 1.0 g. of triethylamine in 12 cc. of ethanol were refluxed 10 minutes on the steam bath. After chilling and filtering, the dye was recrystallized from benzene-petroleum ether as maroon microcrystals, M. P. 200° C.

In the above example, the acetanilidovinyl intermediate was produced in situ through the use of the corresponding anilinovinyl compound together with acetic anhydride. This method is particularly advantageous in increasing yields and providing condensations which otherwise proceed only with difficulty.

*Example 16.—1 - acetyl-3-ethyl-5-[(3-ethyl-4,5-diphenylthiazolin-2-ylidene)ethylidene]-2-thiohydantoin*

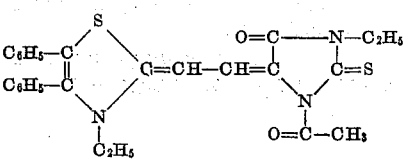

2.0 g. of 1-acetyl-3-ethyl-2-thiohydantoin, 2.77 g. of 2-β-anilinovinyl-4,5-diphenylthiazole etho-p-toluenesulfonate, 0.5 g. of acetic anhydride with 1.01 g. of triethylamine in 12 cc. of ethanol were refluxed for 10 minutes on the steam bath. After chilling and filtering, the dye was recrystallized from benzene-petroleum ether as glistening round leaflets, M. P. 210° C.

*Example 17.—1 - acetyl-3-ethyl-5-[(1-ethyldihydroquino-lin-2-ylidene)ethylidene]-2-thiohydantoin*

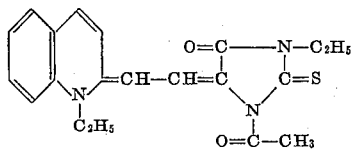

2.0 g. of 1-acetyl-3-ethyl-2-thiohydantoin, 2.22 g. of 2-β-acetanilidovinylquinoline ethiodide with 0.5 g. of triethylamine in 10 cc. of ethanol were refluxed for 10 minutes on the steam bath. After chilling and filtering, the dye was recrystallized from pyridine-methanol as an indigo powder, M. P. 207° C.

*Example 18.—1 - acetyl-3-ethyl-5-[(1-ethyldihydroquino-line-4-ylidene)ethylidene]-2-thiohydantoin*

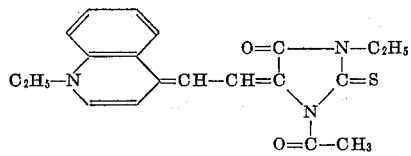

2.0 g. of 1-acetyl-3-ethyl-2-thiohydantoin, 2.22 g. of 4-β-acetanilidovinylquinoline ethiodide with 0.5 g. of triethylamine in 10 cc. of ethanol were refluxed for 10 minutes on the steam bath. After chilling and filtering, the dye was recrystallized from benzene-petroleum ether as dark green needles, M. P. 184° C.

*Example 19.—1-acetyl-3-ethyl-5-(3-ethylbenzothiazolin-2-ylidene)-2-thiohydantoin*

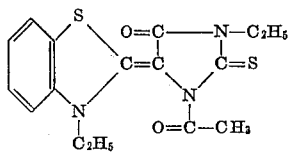

2.0 g. of 1-acetyl-3-ethyl-2-thiohydantoin, 3.95 g. of 2-ethylthiobenzothiazole etho-p-toluenesulfonate with 1.01 g. of triethylamine in 15 cc. of ethanol were heated for 15 minutes on the steam bath. The dye was collected and recrystallized from ethanol as lemon-yellow plates, M. P. 243° C.

*Example 20.—1-acetyl-3-benzyl-5[(3-ethylnaphtho-1':2'-4:5-oxazolin-2-ylidene)ethylidene]-2-thiohydantoin*

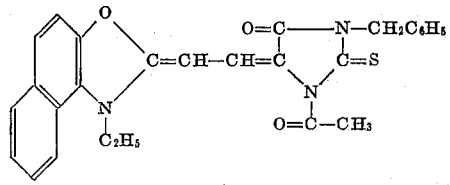

2.0 g. of 3-benzyl-1-acetyl-2-thiohydantoin, 2.42 g. of 2 -β- acetanilidovinlnaphtho - 1':2'-4:5 - oxazole ethiodide with 0.7 cc. of triethylamine in 10 cc. of ethanol were heated for 10 minutes on the steam bath. The dye was collected and recrystallized from pyridine-methanol as orange flakes, M. P. 320° C.

*Example 21.—3-ethyl-5-[(3-ethylthiazolidin - 2 - ylidene)ethylidene]-1-propionyl-2-thiohydantoin*

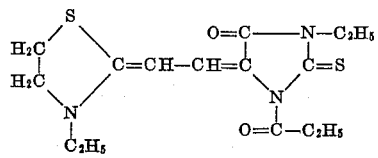

3-ethyl-1 - propionyl - 2 - thiohydantoin, which resulted from the reaction described below in Example 29, 4.0 g. of 2-β-acetanilidovinylthiazoline ethiodide and 1.4 cc. of triethylamine in 15 cc. of ethanol were heated for 10 minutes on the steam bath. The dye which crystallized on cooling was recrystallized from benzene-petroleum ether as khaki needles, M. P. 160° C.

*Example 22.—3-ethyl-5-[(3-ethylbenzoxazolin-2-ylidene)ethylidene-1-propionyl-2-thiohydantoin*

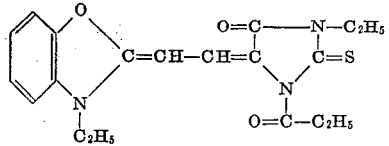

3-ethyl-1-propionyl-2-thiohydantoin obtained according to Example 29 below, 4.34 g. of 2-β-acetanilidovinyl-benzoxazole ethiodide with 1.4 cc. of triethylamine in 15 cc. of ethanol were refluxed 10 minutes on the steam bath. On cooling, the dye crystallized and it was recrystallized from benzene-petroleum ether as red flakes with a blue reflex, M. P. 195° C.

The 2-thiohydantoin compounds embraced by Formula III above can advantageously be prepared by condensing together a compound selected from those represented by the following general formula:

V

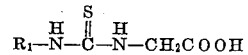

wherein R₁ has the values given above together with a carbocyclic anhydride selected from those represented by the following general formula:

VI

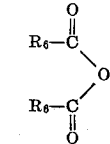

wherein R₆ represents an alkyl group, e. g. methyl, ethyl, propyl, isopropyl, etc. or an aryl group, e. g. phenyl, o-, m- and p-tolyl, etc. (cf. Harries and Weiss—"Ann."—vol. 327 (1903), page 355; Brautlecht—"J. Biol. Chem." vol. 10 (1911), page 139; and Johnson and Renfrew—vol. 33 (1911) page 1977 and vol. 47 (1925), page 240.

The following examples will serve to illustrate the preparation of the intermediates represented by Formula III above.

*Example 23.—1-acetyl-3-methyl-2-thiohydantoin*

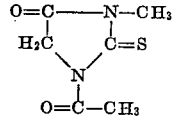

4.0 g. of N-carboxymethyl-N'-methylthiourea and 15 cc. of acetic anhydride were heated for a quarter of an hour on the steam bath and the solvents were removed under reduced pressure. The resulting oil was used in the above examples without further purification.

*Example 24.—1-acetyl-3-ethyl-2-thiohydantoin*

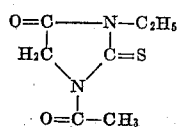

This intermediate was prepared in the same manner as that of Example 23, using 4.0 g. of N-carboxymethyl-N'-ethylthiourea and acetic anhydride.

*Example 25.—1-acetyl-3-n-octyl-2-thiohydantoin*

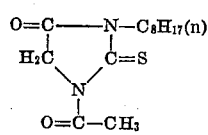

This intermediate was prepared in the same manner as that of Example 23, using N-carboxymethyl-N'-n-octyl thiourea and acetic anhydride.

*Example 26.—1-acetyl-3-benzyl-2-thiohydantoin*

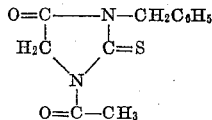

This intermediate was prepared in the same manner as that of Example 23 using N-carboxymethyl-N'-benzyl thiourea and acetic anhydride.

*Example 27.—1-acetyl-3-cyclohexyl-2-thiohydantoin*

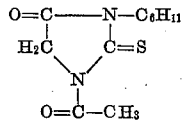

This intermediate was prepared in the same manner as that of Example 23 using N-carboxymethyl-N'-cyclohexyl thiourea.

*Example 28.—1-acetyl-3-carboxymethyl-2-thiohydantoin*

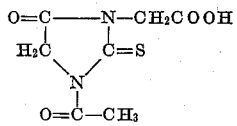

This intermediate was prepared in the same manner as that of Example 23 using N,N'-dicarboxymethyl thiourea.

*Example 29.—3-ethyl-1-propionyl-2-thiohydantoin*

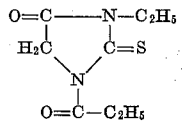

2.0 g. of N-carboxymethyl-N'-ethylthiourea and 10 cc. of propionic anhydride were heated for a quarter of an hour on the steam bath and the residual solvents removed under reduced pressure. The resulting oil was used directly to prepare the dyes of Examples 21 and 22 above.

In like manner, other acylated 2-thiohydantoin compounds can be prepared by using carboxylic anhydrides different from those illustrated in Examples 23–29 above.

The intermediates represented by Formula V above can advantageously be prepared by condensing together a compound selected from those represented by the following general formula:

VII

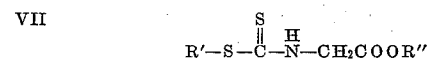

wherein R' represents an alkyl group, such as methyl, ethyl, etc., and R" represents a hydrogen atom or an alkyl group, such as methyl, ethyl, etc., with a primary amine selected from those represented by the following general formula:

VIII 

wherein $R_1$ has the values set forth above, in the presence of aqueous alkali, e. g. potassium hydroxide.

The following examples will serve to illustrate the manner whereby the intermediates of Formula V can be prepared.

*Example 30.—N-carboxymethyl-N'-methylthiourea*

N-dithiocarbethoxyglycine (53.7 g.) and potassium hydroxide (16.8 g.) were dissolved in water (45 cc.) and ethanol (90 cc.). Methylamine, 25% in aqueous solution, (40.8 cc.), was added and the whole refluxed for 24 hours. Two-thirds of the solvent was distilled off at reduced pressure, and the residual solution cooled and acidified with HCl. On scratching, a solid separated. This was washed with cold water, and recrystallized from a mixture of methanol and ethyl acetate by adding petroleum ether. It was obtained as colorless prisms, M. P. 168° C.

*Example 31.—N-carboxymethyl-N'-ethylthiourea*

N-dithiocarbethoxyglycine (53.7 g.) and potassium hydroxide (16.8 g.) were dissolved in water (45 cc.) and ethanol (90 cc.). Ethylamine, 70% in aqueous solution (21 cc.), was added, and the whole refluxed for 24 hours. Two-thirds of the solvent was distilled off at reduced pressure, and the residual solution cooled and acidified with HCl. On scratching a solid separated. This was washed with cold water, and recrystallized from ethyl acetate containing a little methanol, and petroleum ether, as colorless prisms, M. P. 170° C.

*Example 32.—N-carboxymethyl-N'-n-octylthiourea*

N-dithiocarbethoxyglycine (53.7 g.) and potassium hydroxide (16.8 g.) were dissolved in water (45 cc.) and ethanol (90 cc.). n-Octylamine (43 g., 56 cc.) was added, and the whole refluxed for 24 hours. Two-thirds of the solvent was distilled off at reduced pressure, and the residual solution cooled and acidified with HCl. On scratching a solid separated. This was washed with cold water, and was recrystallized from ethyl acetate by adding petroleum ether, as colorless waxy needles, M. P. 125° C.

*Example 33.—N-benzyl-N'-carboxymethylthiourea*

N-dithiocarbethoxyglycine (26.9 g.) and potassium hydroxide (8.4 g.) were dissolved in ethanol (70 cc.), and benzylamine (16.5 g.) added. The solution was refluxed 24 hours. Water (35 cc.) was added, and the solution acidified with HCl. A solid precipitated. It was washed with water, and recrystallized from ethyl acetate containing a little methanol, and petroleum ether, as white prisms, M. P. 189° C.

*Example 34.—N-carboxymethyl-N'-cyclohexylthiourea*

N-dithiocarbethoxyglycine (26.9 g.) and potassium hydroxide (8.4 g.) were dissolved in ethanol (70 cc.) and cyclohexylamine (16 g., 19.5 cc.) added. The solution was refluxed 24 hours. Water (35 cc.) was added, and the solution acidified with HCl. A solid precipitated. It was washed with water, and recrystallized from ethyl acetate-petroleum ether as colorless needles, M. P. 155° C.

*Example 35.—N,N'-dicarboxymethylthiourea*

N-dithiocarbethoxyglycine (17.9 g.) and potassium hydroxide (11.2 g.) were dissolved in water (15 cc.) and ethanol (30 cc.). Glycine (7.5 g.) was added, and the solution refluxed 24 hours. Two-thirds of the solvent was removed, and the residue acidified with HCl. The product which precipitated was recrystallized from ethyl acetate, containing a little methanol, and petroleum ether, as colorless prisms, M. P. 170° C. with decomposition.

I have found that my new dyes spectrally sensitize photographic silver halide emulsions when incorporated therein. The dyes are especially useful for extending the spectral sensitivity of the customarily employed gelatino-silver-chloride, gelatino-silver chlorobromide, gelatino-silver-bromide and gelatino-silver bromiodide developing-out emulsions. To prepare emulsions sensitized with one or more of my new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol or acetone has proved satisfactory as a solvent for most of my new dyes. Where the dyes are quite insoluble in methyl alcohol, a mixture of acetone and pyridine is advantageously employed as a solvent. The dyes are advantageously incorporated in the finished, washed emulsions and should be uniformly distributed throughout the emulsions. The particular solvent used will, of course, depend on the solubility properties of the particular dye.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of my new dyes, the following procedure is satisfactory:

A quantity of dye is dissolved in methyl alcohol or acetone (or a mixture of acetone and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of my dyes, from 10 to 20 mg. of dye per liter of gelatino-silver-bromode or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

The following table summarizes the sensitizing data obtained for several of the dyes obtained in the above examples.

SENSITIZING DATA

| Example | Chlorobromide | | Iodobromide | |
|---|---|---|---|---|
| | Peak (mu) | Limits (mu) | Peak (mu) | Limits (mu) |
| 1 | 530 | to 580 | 530 | to 570 |
| 2 | 535 | to 570 | 530 | to 560 |
| 3 | 550 | to 600 | 520 | to 570 |
| 4 | 530 | to 580 | 530 | to 570 |
| 5 | 530 | to 570 | 530 | to 560 |
| 6 | 580 | 480–620 | 575 | to 620 |
| 7 | 590 | 520–620 | 570 | to 610 |
| 8 | 580 | 480–620 | 575 | to 610 |
| 9 | 575 | to 630 | 570 | to 610 |
| 10 | 610 | 480–670 | 570–610 | to 650 |
| 11 | 530 | to 570 | 530 | to 580 |
| 12 | 560–640 | 520–680 | | |
| 13 | 580 | 490–620 | 570 | 520–610 |
| 14 | 600 | 470–650 | 590 | 510–640 |
| 15 | 535 | to 580 | 530 | to 570 |
| 16 | 590 | 470–640 | 580 | to 620 |
| 17 | 530–630 | 480–710 | 570–620 | to 670 |
| 18 | | 580–700 | 610–680 | 550–720 |
| 20 | 550 | 470–580 | 545 | to 560 |
| 21 | 530 | 470–560 | | to 550 |
| 22 | 545 | to 580 | 530 | to 580 |

Photographic silver halide emulsions, such as those listed above, containing the sensitizing dyes of my invention can also contain such addenda as chemical sensitizers, e. g. sulfur sensitizers (e. g. allyl thiocarbamide, thiourea, allylisothiocyanate, cystine, etc.), various gold compounds (e. g. potassium chloroaurate, auric trichloride, etc.) (see U. S. Patents 2,540,085; 2,597,856 and 2,597,915), various palladium compounds, such as palladium chloride (U. S. 2,540,086), potassium chloropalladate (U. S. 2,598,079), etc., or mixtures of such sensitizers; antifoggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees—"The Theory of the Photographic Process," MacMillan Pub., page 460), or mixtures thereof; hardeners, such as formaldehyde (U. S. 1,763,533), chrome alum (U. S. 1,763,533, glyoxal (U. S. 1,870,354), dibromacrolein (Br. 406,750), etc.; color couplers, such as those described in U. S. Patent 2,423,730, Spence and Carroll U. S. application 771,380, filed August 29, 1947, etc.; or mixtures of such addenda. Dispersing agents for color couplers, such as those set forth in U. S. Patents 2,322,027 and 2,304,940, can also be employed in the above-described emulsions.

What I claim as my invention and desire secured by Letters Patent of the United States is:

1. A merocyanine dye selected from those represented by the following general formula:

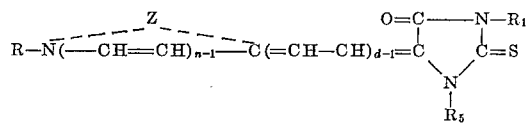

wherein R represents an alkyl group of the formula $C_mH_{2m+1}$ wherein $m$ represents a positive integer of from 1 to 8, $R_1$ represents a member selected from the group consisting of an alkyl group of the formula $C_qH_{2q+1}$ wherein $q$ represents a positive integer of from 1 to 8, a cycloalkyl group containing from 3 to 6 carbon atoms in the cycloalkyl ring, and an aralkyl group containing from 7 to 8 carbon atoms, $R_5$ represents an acyl group selected from the group consisting of acetyl, propionyl, butyryl, isobutyryl, benzoyl, and toluoyl, $n$ represents a positive integer of from 1 to 2, $d$ represents a positive integer of from 1 to 3 and Z represents the non-metallic atoms necessary to complete a heterocyclic nucleus containing from 5 to 6 atoms in the heterocyclic ring.

2. The merocyanine dye represented by the following formula:

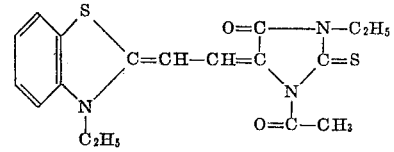

3. The merocyanine dye represented by the following formula:

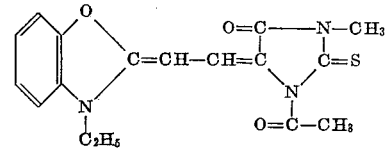

4. The merocyanine dye represented by the following formula:

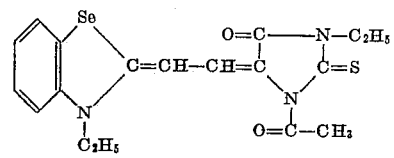

5. The merocyanine dye represented by the following formula:

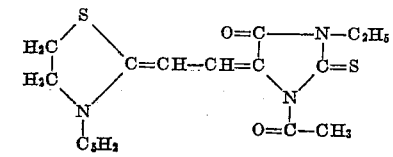

6. The merocyanine dye represented by the following formula:

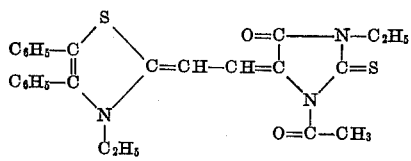

7. A method for making merocyanine dyes comprising condensing a 2-thiohydantoin compound selected from those represented by the following general formula:

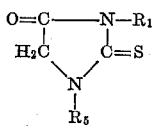

wherein $R_1$ represents a member selected from the group consisting of an alkyl group of the formula $C_qH_{2q+1}$ wherein $q$ represents a positive integer of from 1 to 8, a cycloalkyl group containing from 3 to 6 carbon atoms in the cycloalkyl ring and an aralkyl group containing from 7 to 8 carbon atoms, and $R_5$ represents an acyl group selected from the group consisting of acetyl, propionyl, butyryl, isobutyryl, benzoyl, and toluoyl, with a cyclammonium quaternary salt selected from those having the following general formula:

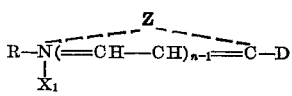

wherein R represents an alkyl group of the formula $C_mH_{2m+1}$ wherein $m$ represents a positive integer of from 1 to 8, $X_1$ represents an acid radical, $n$ represents a positive integer of from 1 to 2, Z represents the non-metallic atoms necessary to complete a heterocyclic nucleus containing from 5 to 6 atoms in the heterocyclic ring and D represents a member selected from the group consisting of an alkylmercapto group, an arylmercapto group, a β-arylaminovinyl group, and a δ-arylamino-1,3-butadienyl group.

No references cited.